March 24, 1925.

F. L. MORROW 1,531,256

AUTOMATIC POTATO CHIP MACHINE

Filed Oct. 11, 1923    2 Sheets-Sheet 1

INVENTOR
F. L. Morrow
BY
ATTORNEYS

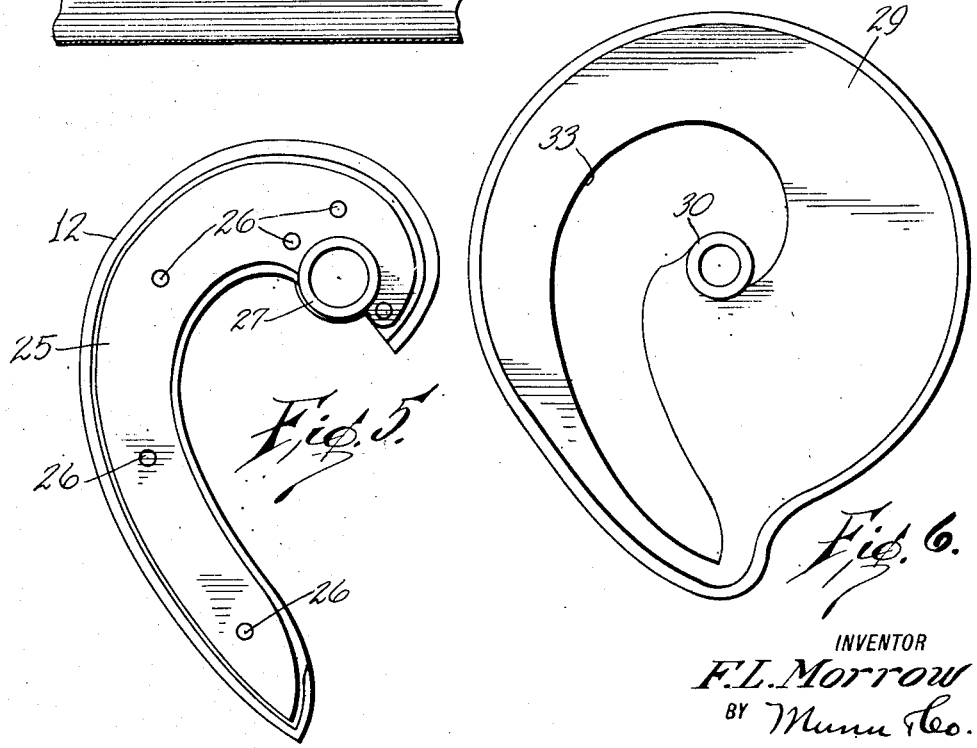

Patented Mar. 24, 1925.

1,531,256

UNITED STATES PATENT OFFICE.

FORREST L. MORROW, OF WILMETTE, ILLINOIS.

AUTOMATIC POTATO-CHIP MACHINE.

Application filed October 11, 1923. Serial No. 667,986.

*To all whom it may concern:*

Be it known that I, FORREST L. MORROW, a citizen of the United States, and a resident of Wilmette, in the county of Cook and State of Illinois, have invented a new and useful Improvement in Automatic Potato-Chip Machines, of which the following is a full, clear, and exact description.

My invention relates to improvements in automatic potato chip machines, and it consists in the combinations, constructions, and arrangements herein described and claimed.

An object of my invention is to provide an automatic potato chip machine in which the potatoes are adapted to be cut into chips and automatically dropped into boiling fat for a predetermined length of time, after which the chips are automatically removed from the fat.

A further object of my invention is to provide a device of the character described in which the means for cooking the chips a predetermined length of time consists in a runway in which boiling fat is moved at a certain speed, whereby the chips are cooked during the length of time necessary for the chips to move the entire length of the runway.

Other objects and advantages will appear in the following specification, and the novel features of the invention will be particularly pointed out in the appended claim.

My invention is illustrated in the accompanying drawings forming part of this specification, in which—

Figure 3 is a vertical section through the hopper and potato chip cutter,

Figure 4 is a rear elevation of Figure 3,

Figure 5 is a plan view of the knife and knife holder, and

Figure 6 is a plan view of the adjusting plate.

Figure 1:
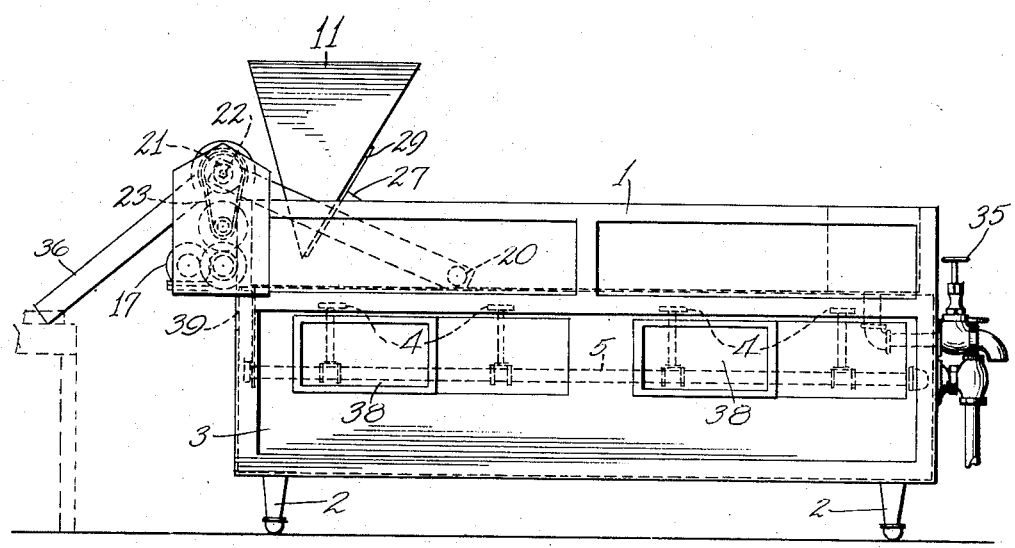
Figure 1 is a side elevation of the device.

In carrying out my invention, I provide a frame, indicated generally at 1, which is supported by legs 2. The frame has a hollow space or compartment 3 in which burners 4 are disposed. In the present form of the device, I have used eight burners which are disposed in two rows 5 and 6, the burners being positioned beneath the fat runway 7.

Figure 2:
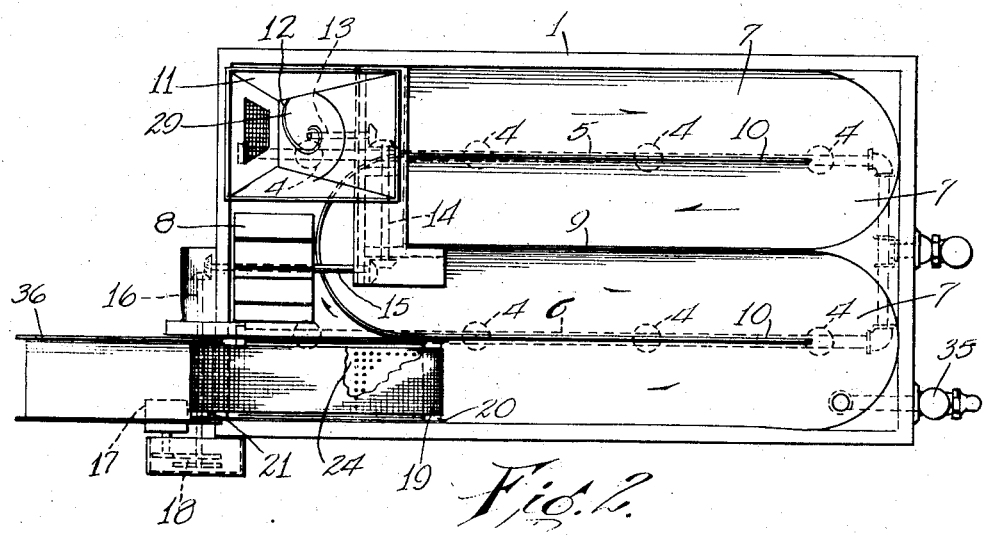
Figure 2 is a plan view of the device.

In Figure 2 I have clearly shown the path the boiling fat takes as it is moved along the runway 7 by means of the paddle 8. A central partition 9 and two partitions 10 divide the fat containing reservoir into four longitudinally extending runways, these runways being connected at opposite ends so as to provide a continuous path for the fat.

A potato hopper 11 is disposed adjacent to the paddle 8 and is adapted to deliver chips to the runway. The means for cutting the potatoes into chips comprises a cutting knife 12 which will be hereinafter described in detail. The knife 12 is rotated by means of a shaft 13, which in turn is rotated by means of shafts 14, 15, and 16, the shafts 13, 14, 15, and 16 being connected to each other by beveled gears. The shaft 16 in turn is connected to a motor 17 by means of gearing 18. The paddle 8 is mounted upon the shaft 15, and will be rotated when the knife is rotated so as to cause the boiling fat to flow in the direction indicated by the arrows in Figure 2.

The oil flows from the hopper 11 in a circuitous path to a conveyor belt 19. In the present form of the device, the belt 19 is a chain belt, and is mounted upon corrugated rollers 20 and 21. The roller 21 is mounted upon a shaft 22 which is operatively connected to the shaft 16 by means of a chain 23. The drip pan 24 is disposed beneath the belt 19, and permits the fat that drains from the chips that are being carried along on the belt to drip back into the fat runway 7.

In Figures 3, 4, 5, and 6 I have shown the potato cutting means in detail. A knife 12 is secured to a knife holder 25 by means of screws 26. The holder 25 has a sleeve 27 which is adapted to be slipped on to the shaft 13 and to be locked in position by means of a set screw 28. An adjusting plate 29 is also provided with a sleeve 30 and is adapted to be slipped on to the shaft 13 and locked in adjusted position by means of a set screw 31. The hopper 11 has an opening 32 therein that permits the potatoes to drop on to the plate 29. The weight of the potatoes causes them to bear against the plate 29 and come into engagement with the rotating knife 12. The holder 25 and the plate 29 are adjusted with respect to each other so as to dispose the knife 12 above the plane of the plate 29 a sufficient distance to cause the knife to cut the potatoes into chips. The plate 29 has an opening 33 therein which is of the same shape as the knife 12 but of a larger area so as to provide a space 34 between the inner edge of the opening 33 and the cutting edge of the knife 12, (see Figure 4).

The cutting edge of the knife is in the shape of a scroll, i. e., the edge starts at a point adjacent to the shaft 13 and ends at a point adjacent to the outer edge of the plate 29. A knife shaped in this manner can quickly cut the potato into chips.

From the foregoing description of the various parts of the device, the operation thereof may be readily understood. In operation the burners 4 are lighted, and heat the fat in the runway 7. Raw peeled potatoes are placed in the hopper 11 and are cut by the knife 12 into chips. As heretofore stated, the paddle 8 and the knife 12 are actuated by the same motor 17. The cut chips drop into the fat and are carried along the runway 7 by the moving fat. The runway 7 is of sufficient length to thoroughly cook the chips before the chips reach the end of the runway. The lower end of the belt 19 is immersed in the fat and removes the chips from the fat, since the chips are flowing on the top of the fat. The fat continues to flow past the lower end of the chain 19 back to the paddle 8, where it is again impelled in a forward direction by the rotating paddle. In this manner the same fat can be used time after time. A drain cock 35 is adapted to drain the fat from the runway 7.

Any fat that may be on the chips flows off and drips into the drain pan 24, passes through the openings in the drain pan, and back into the runway 7. A chute 36 communicates with the upper end of the chain 19, and delivers the chips to any receptacle desired. Sliding doors 38 are provided in the frame 1 so as to permit access to the burners. Openings 39 are also provided on three sides of the frame 1, these openings communicating with the compartment 3 so as to provide proper ventilation to the burners 4. The wall disposed around the runway 7 is thick so as to retain the heat.

The device described herein has a distinct advantage over those devices which have hitherto been used. Ordinarily, it is customary to soak the potatoes for a considerable time in water in order to extract a good portion of the starch, otherwise the potato chips in ordinary devices will stick together, and this will render them unsalable. In the present device, the cutter is so arranged that the chips will fall one by one into the fat. The moment they are covered with the fat or grease, there will be no tendency for them to stick together, so that the chips come out of the device one by one, and do not stick together as in the ordinary potato chip frying machine.

Moreover the starch which is retained in the chips due to the fact that they are not soaked in water renders them more wholesome. The methods which have been used heretofore in producing potato chips require ten to thirty minutes for cooking the chips on account of the fact that a quantity of chips are ordinarily placed in the fat at one time, thereby reducing the temperature so that a longer time is required to sufficiently cook them. In the present device, the machine is continuously operated, so that the stream of chips is falling into the fat only as fast as it is cooked. This enables one to keep the temperature at the right place at all times. Only three to five minutes is required for cooking the chips with this device. The chips being cooked in a shorter time, absorb less fat, and this again cuts down the expense of the operation. The starch which is retained in the chips adds to the weight, and hence to the returns which the sale of the chips brings.

I claim:

In combination, an endless channel for containing a liquid, a potato slicing device operative and mounted to slice potatoes and feed chips separately into said channel, means for removing said chips from said channel, revolvable blades for circulating said liquid in said channel, said channel being otherwise unobstructed and said revolvable blades being disposed in said channel in that portion thereof in which the flow of said liquid is from said removing means to said slicing device, and means for simultaneously operating said slicing device and said revolvable blades, whereby said chips drop consecutively upon said circulating liquid in spaced relation and, thus distributed, float upon and are carried by said circulating liquid to said removing means.

FORREST L. MORROW.